United States Patent
Wang et al.

(10) Patent No.: US 12,373,317 B2
(45) Date of Patent: Jul. 29, 2025

(54) METHOD AND APPARATUS FOR IMPROVING QUALITY OF SERVICE OF SSD, AND COMPUTER DEVICE AND STORAGE MEDIUM

(71) Applicant: Suzhou MetaBrain Intelligent Technology Co., Ltd., Suzhou (CN)

(72) Inventors: Xin Wang, Suzhou (CN); Zhe Liu, Suzhou (CN); Jin Zhao, Suzhou (CN); Qiankun Zhang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/567,276

(22) PCT Filed: Apr. 28, 2022

(86) PCT No.: PCT/CN2022/090021
§ 371 (c)(1),
(2) Date: Dec. 5, 2023

(87) PCT Pub. No.: WO2023/077751
PCT Pub. Date: May 11, 2023

(65) Prior Publication Data
US 2024/0272998 A1    Aug. 15, 2024

(30) Foreign Application Priority Data
Nov. 4, 2021 (CN) .......................... 202111301938.3

(51) Int. Cl.
G06F 11/00 (2006.01)
G06F 11/22 (2006.01)

(52) U.S. Cl.
CPC ...... G06F 11/2221 (2013.01); G06F 11/2273 (2013.01)

(58) Field of Classification Search
CPC . G06F 11/2221; G06F 11/2273; G06F 9/4418
(Continued)

(56) References Cited

U.S. PATENT DOCUMENTS

| | | | |
|---|---|---|---|
| 7,254,813 B2 * | 8/2007 | Leong ................... | G06F 3/0619 714/6.32 |
| 10,268,419 B1 | 4/2019 | Tylik et al. | |

(Continued)

FOREIGN PATENT DOCUMENTS

| | | |
|---|---|---|
| CN | 105900061 A | 8/2016 |
| CN | 109245772 A | 1/2019 |

(Continued)

OTHER PUBLICATIONS

International Search Report dated Jul. 22, 2022; Application No. PCT/CN2022/090021.
(Continued)

*Primary Examiner* — Sarai E Butler
(74) *Attorney, Agent, or Firm* — Maschoff Brennan

(57) ABSTRACT

A method for improving quality of service of an SSD includes the following steps: determining a quantity of context resources of an SSD, and managing the quantity of context resources by using a token bucket algorithm; receiving and processing a host IO command, and counting a quantity of being-used context resources of the SSD; and judging whether to receive a new host IO command according to the quantity of context resources and the quantity of being-used context resources.

20 Claims, 3 Drawing Sheets

(58) Field of Classification Search
USPC ........................................................ 714/1–57
See application file for complete search history.

(56) References Cited

U.S. PATENT DOCUMENTS

| | | | | |
|---|---|---|---|---|
| 11,775,186 | B1* | 10/2023 | Setter .................... | G06F 3/0604 |
| | | | | 711/100 |
| 2010/0223624 | A1 | 9/2010 | Auernhammer et al. | |
| 2015/0373017 | A1* | 12/2015 | Oelke ................. | H04L 63/0807 |
| | | | | 710/17 |

FOREIGN PATENT DOCUMENTS

| | | |
|---|---|---|
| CN | 112306415 A | 2/2021 |
| CN | 113741991 A | 12/2021 |

OTHER PUBLICATIONS

Written Opinion dated Jul. 22, 2022; Application No. PCT/CN2022/090021.
First Chinese Office Action, Application No. 2021113019383.

\* cited by examiner

METHOD AND APPARATUS FOR IMPROVING QUALITY OF SERVICE OF SSD, AND COMPUTER DEVICE AND STORAGE MEDIUM

CROSS-REFERENCE TO RELATED APPLICATIONS

The present application is the U.S. National stage of PCT/CN2022/090021 filed on Apr. 28, 2022, which claims the priority of Chinese patent application filed to CNIPA on Nov. 4, 2021, with the application number of 202111301938.3 and the application name of "Method and apparatus for improving quality of service of SSD, and computer device and storage medium", which is incorporated herein by reference in its entirety.

TECHNICAL FIELD

The present application relates to the technical field of computers, in particular relates to a method and an apparatus for improving quality of service of an SSD, and computer device and storage medium.

TECHNICAL BACKGROUND

In the era of big data, the storage and acquisition of big data put forward higher performance requirements for storage devices. As a mainstream storage device, SSDs came into being. From upper-layer applications to bottom-layer storage, the performance of each link directly or indirectly affects the end-user experience. Therefore, it is of vital importance how to improve the performance of data storage and data acquisition.

In the field of computers, relative to a process, a context is an environment where the process is executed, that is, a context comprises various variables and data, such as all register variables, files opened by the process, memory information and so on. The context can also be understood as a snapshot of the environment, which is an object used for saving a state. Usually, most functions in a program do not run independently, but need to interact with part of other functions and need the support of other external environmental variables, and the context is used to assign values to external environmental variables to enable the functions run normally.

The inventors realize that the processing of host IO by an SSD needs to be managed by a context, and a process of processing the IO requires operations such as updating and obtaining metadata, so this process is relatively complex. In order to improve the performance of an SSD, these operations need to realize concurrent operations and state machine management, which requires a context to record and manage each state machine. Due to the limitation of hardware resources and capabilities, these context resources are limited. When processing workloads of different host IOs, there may occur a situation that context resources cannot be obtained. This would cause a state machine to enter a suspended state, and while processing these suspended state machines, the queue accumulation effect deteriorates response speed for the corresponding IO commands, thus adversely affecting the QOS (Quality of Service) of the SSD.

SUMMARY

The present application provides a method for improving quality of service of an SSD, which comprises the following steps:

determining a quantity of context resources of an SSD, and managing the quantity of context resources by using a token bucket algorithm;

receiving and processing a host IO command, and counting a quantity of being-used context resources of the SSD; and judging whether to receive a new host IO command according to the quantity of context resources and the quantity of being-used context resources.

In one embodiment, the method further comprises counting a quantity of suspended state machines of the SSD, wherein judging whether to receive a new host IO command according to the quantity of context resources and the quantity of being-used context resources comprises:

judging whether to receive a new host IO command according to the quantity of context resources, the quantity of being-used context resources and the quantity of suspended state machines.

In one embodiment, the context resources of the SSD include first context resources and second context resources, wherein the first context resources are used for managing a quantity of receivable host IO commands, and the second context resources are used for managing data structures split from host IO commands.

In one embodiment, the step of determining the quantity of context resources of the SSD comprises:

initializing a quantity of first context resources and a quantity of second context resources;

performing read/write IOPS tests based on an initial quantity of first context resources and an initial quantity of second context resources;

keeping the quantity of first context resources unchanged and continuously increasing the quantity of second context resources, and continuously performing the IOPS tests until a throughput thereof is no longer increasing;

taking a minimum quantity of second context resources corresponding to a maximum throughput as the quantity of the second context resources; and determining the quantity of the first context resources according to the quantity of the second context resources.

In one embodiment, a ratio of the quantity of the second context resources to the quantity of the first context resources is 1:32.

In one embodiment, the step of counting a quantity of suspended state machines of the SSD comprises:

counting the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

In one embodiment, the step of judging whether to receive a new host IO command according to the quantity of context resources, the quantity of being-used context resources and the quantity of suspended state machines comprises:

stopping receiving any new host IO command by the SSD when the quantity of being-used first context resources reaches the quantity of the first context resources or the quantity of suspended state machines reaches a preset threshold.

The present application also provides an apparatus for improving quality of service of an SSD, wherein the apparatus comprises a resource determination module, a resource counting module and a judgment module, wherein:

the resource determination module is configured to determine a quantity of context resources of an SSD, and to manage the quantity of context resources by using a token bucket algorithm, the resource counting module is configured to receive and process a host IO command, and to count a quantity of being-used context resources of the SSD; and the judgment module is configured to judge whether to receive a new host IO command according to the quantity of context resources and the quantity of being-used context resources.

The present application also provides a computer device comprising a memory and one or more processors, wherein computer-readable instructions are stored in the memory, and when executed by the one or more processors, the computer-readable instructions cause the one or more processors to perform the steps of the method for improving quality of service of an SSD according to any one of the above embodiments.

Finally, the present application also provides one or more non-transitory computer-readable storage media, with computer-readable instructions stored therein, wherein the computer-readable instructions, when executed by one or more processors, cause the one or more processors to perform the steps of the method for improving quality of service of an SSD according to any one of the above embodiments.

Details of one or more embodiments of the present application are set forth in the following drawings and description. Other features and advantages of the present application will become apparent from the description, drawings and claims.

BRIEF DESCRIPTION OF DRAWINGS

In order to explain the technical scheme in the embodiments of the present application more clearly, the drawings used in describing the prior art and the embodiments will be briefly introduced below. Apparently, the drawings described below are only some embodiments of the present application. For a person skilled in the art, other drawings can be obtained according to these drawings without expenditure of creative labor.

DETAILED DESCRIPTION

In order to make the purpose, technical scheme and advantages of the present application more clearly understood, the present application will be further described in detail with reference to the appended drawings and embodiments. It should be understood that the specific embodiments described herein are only used to explain the present application, and are not intended to limit the present application.

The main idea of the present application lies in that:

When processing the SQ of HOST IO, a token bucket algorithm is used to manage the context resources within the SSD. When tokens in the bucket are insufficient or overused, no new IO command in the SQ will be received and processed.

Figure 1:
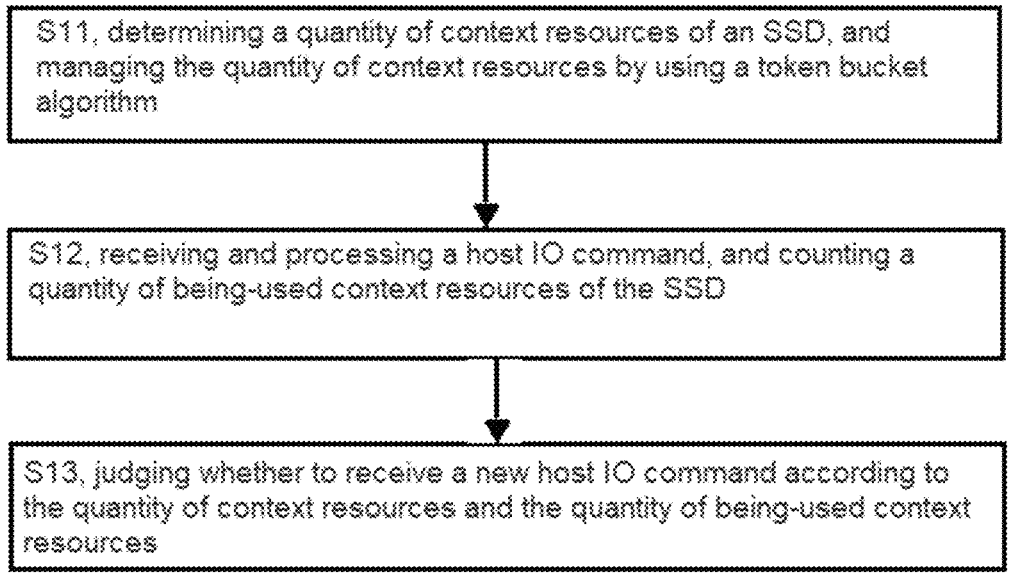
FIG. 1 is a schematic flow diagram of a method for improving quality of service of an SSD provided by the present application according to one or more embodiments.

In one embodiment, as shown in FIG. 1, a method for improving quality of service of an SSD is provided, which is illustrated by an example of applying the method to a computer device, the method includes the following steps:

S11, determining a quantity of context resources of an SSD, and managing the quantity of context resources by using a token bucket algorithm;

Specifically, the quantity of context resources, that is, the capacity of the token bucket, is determined according to the processing capability and degree of concurrency of the back-end nand flash.

In one embodiment, the context resources of the SSD comprise first context resources and second context resources. The first context resources are used to manage a quantity of receivable host IO commands, and the second context resources are used to manage data structures split from host IO commands.

Specifically, X and Y represent two kinds of context resources, X is used to manage IO cmd commands, and Y is used to manage data structure resources split from IO commands. For example, the block size from the host is 128K, and the 128K is managed by X context resources. After the SSD receives the 128K, the 128K will be split into 32 units of 4K (a data management unit in the SSD is 4K), and the 32 units of 4K will be managed by Y context resources.

In one embodiment, determining a quantity of context resources of an SSD in step S11 comprises:

Step S111, initializing a quantity of first context resources and a quantity of second context resources;

Step S112, performing read/write IOPS tests based on an initial quantity of first context resources and an initial quantity of second context resources;

Step S113, keeping the quantity of first context resources unchanged and continuously increasing the quantity of second context resources, and continuously performing the IOPS tests until a throughput thereof is no longer increasing;

Step S114, taking a minimum quantity of second context resources corresponding to a maximum throughput as the quantity of the second context resources; and Step S115, determining the quantity of the first context resources according to the quantity of the second context resources.

Specifically, the X context resources are based on the maximum pressure of the host during the throughput test (calculated by the throughput of sequential reading and writing), there are 4 jobs*256 IODs=1024 under the maximum pressure, and the initial quantity of X context resources in SSD are 1024, thus ensuring that the IOD of the host (IOD is the 10 queue depth of the host) is processed at least once.

The Y context resources are based on FFL and back-end processing capability, assuming that the degree of concurrency of back-end processing capability is n, in order to make the IO commands ping-pang so that the back-end bandwidth is full, the quantity of front-end context resources is set to be 2n~3n. In practice, according to the test situation, the quantity of context resources may be continuously increased during the IOPS test of random reading and writing, until the throughput thereof does not increase any more.

In one embodiment, a ratio of the quantity of the second context resources to the quantity of the first context resources is 1:32.

Specifically, if the block size from the host is 4K, the X resources and the Y resources have a one-to-one relationship S12, receiving and processing a host IO command, and counting a quantity of being-used context resources of the SSD;

Specifically, adding the statistics function of the quantity of context resources in the SSD firmware, which is initialized to be the quantity of resources X determined in the step S11 at the time of power-on. When the SSD receives and processes an IO, it will apply for context resources. When it applies for context resources for one time. X is decreased by 1, and when an IO is finished and resources are released, X is increased by 1.

S13, judging whether to receive a new host IO command according to the quantity of context resources and the quantity of being-used context resources.

In one embodiment, the SSD stops receiving any new host IO command in response to the quantity of being-used first context resources reaching the quantity of the first context resources.

In one embodiment, if the quantity of being-used first context resources reaches the quantity of the first context resources, the SSD stops receiving any new host IO command.

Specifically, when the context resources X are exhausted, no new IO command will be received and processed, and the IO commands will be blocked in SQ so as to avoid the extra overhead caused by processing a large quantity of suspensions.

In one embodiment, before the step S3, the method further comprises counting a quantity of suspended state machines of the SSD.

Figure 2:
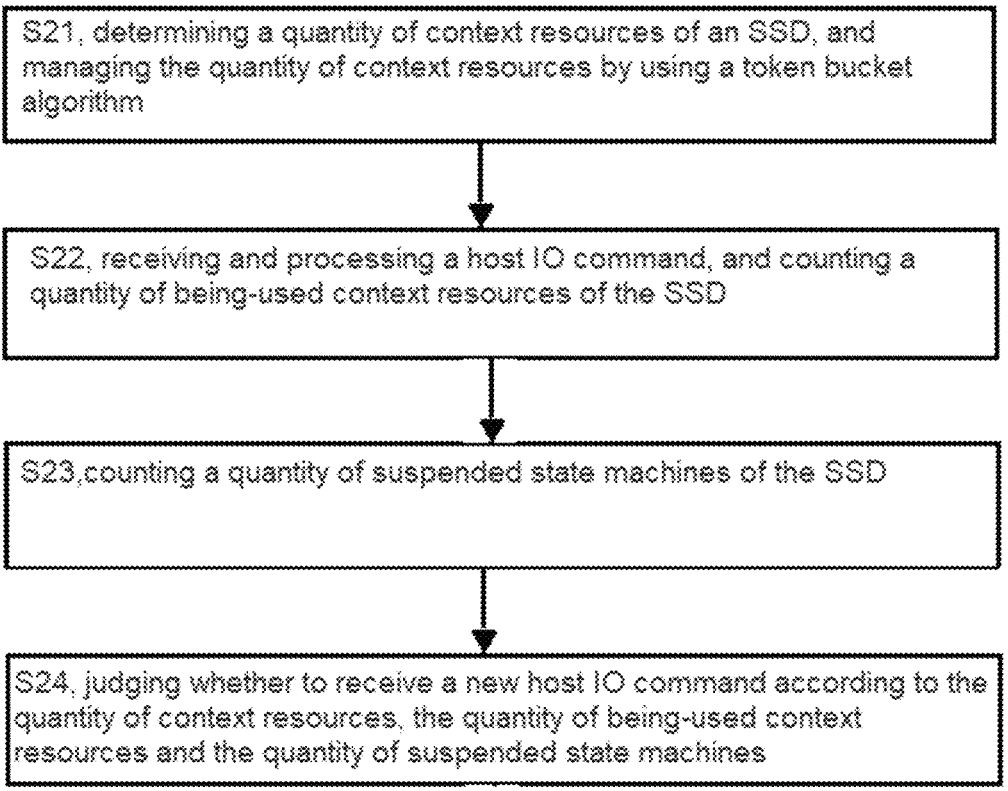
FIG. 2 is a schematic flow diagram of a method for improving quality of service of an SSD provided by the present application according to one or more embodiments.

In this embodiment, as shown in FIG. 2, another method for improving quality of service of an SSD is provided and comprises:

Step S21, determining a quantity of context resources of an SSD, and managing the quantity of context resources by using a token bucket algorithm;

Specifically, the specific content of the step S21 is the same as that of the step S11.

Step S22, receiving and processing a host IO command, and counting a quantity of being-used context resources of the SSD;

Specifically, the specific content of the step S22 is the same as that of the step S12.

Step S23, counting a quantity of suspended state machines of the SSD;

In one embodiment, the step S23 comprises:

Counting the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

Step S24, judging whether to receive a new host IO command according to the quantity of context resources, the quantity of being-used context resources and the quantity of suspended state machines.

In one embodiment, stopping receiving any new IO command by the SSD when the quantity of being-used first context resources reaches the quantity of the first context resources or the quantity of suspended state machines reaches a preset threshold.

Specifically, when the context resources X are exhausted or the quantity Z of suspended state machines reaches a certain threshold, no new IO command will be received and processed, and the IO commands will be blocked in SQ so as to avoid the extra overhead caused by processing a large quantity of suspensions, wherein the threshold for quantity of suspension is set according to an empirical value from actual tests, for example, 10.

In addition, FIFO (First In First Out) management mode should be adopted to deal with the suspended state, so as to ensure the processing order of the IO commands and ensure that the IO command that comes first can be processed as soon as possible. FIFO management is that the state machine that is suspended first is processed first to ensure the order.

In the above method for improving quality of service of an SSD, the QOS of the SSD is improved by means of a token bucket algorithm, which ensures the good experience for users and enhances the competitiveness of products.

It should be understood that, although the steps in the flowcharts of FIGS. 1-2 are displayed in sequence as indicated by arrows, these steps are not necessarily executed in the sequence as indicated by the arrows. Unless explicitly stated herein, the execution of these steps is not strictly limited in a specific order, and these steps may be executed in other orders. Moreover, at least a part of the steps in FIGS. 1-2 may comprise a plurality of sub-steps or stages, which may not necessarily be completed at the same time, but may be executed at different times, and the execution order of these sub-steps or stages may not necessarily be sequentially executed, but may be in turn or alternately executed with other steps or at least a part of sub-steps or stages of other steps.

Figure 3:
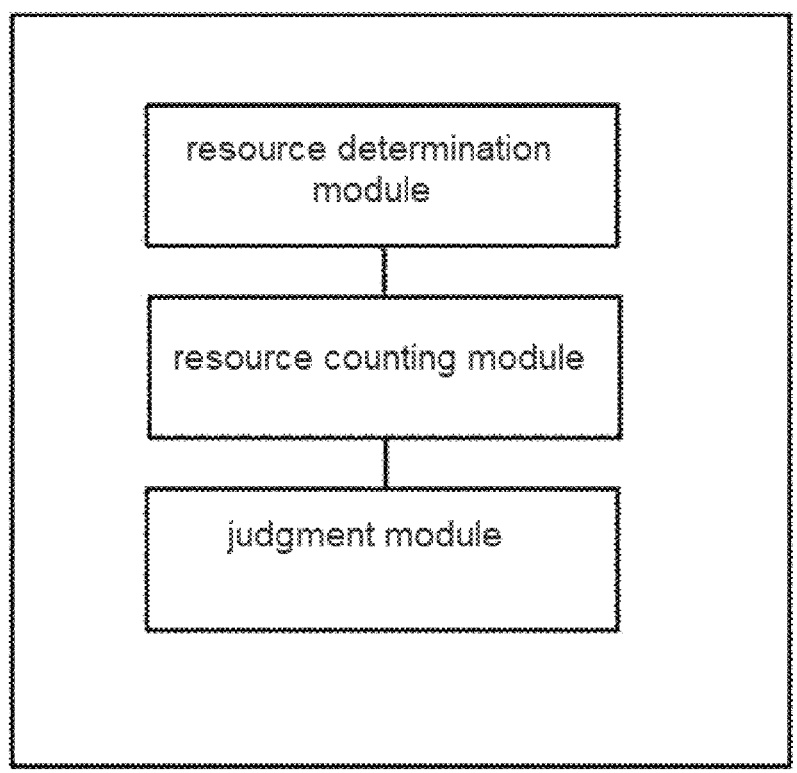
FIG. 3 is a structural block diagram of an apparatus for improving quality of service of an SSD provided by the present application according to one or more embodiments.

In one embodiment, as shown in FIG. 3, an apparatus for improving quality of service of an SSD is provided and comprises: a resource determination module, a resource counting module and a judgment module:

The resource determination module is configured to determine a quantity of context resources of an SSD, and to manage the quantity of context resources by using a token bucket algorithm:

The resource counting module is configured to receive and process a host IO command, and to count a quantity of being-used context resources of the SSD;

In one embodiment, the context resources of the SSD include first context resources and second context resources, wherein the first context resources are used for managing a quantity of receivable host IO commands, and the second context resources are used for managing data structures split from host IO commands.

The judgment module is configured to judge whether to receive a new host IO command according to the quantity of context resources and the quantity of being-used context resources.

In one embodiment, the resource counting module is also configured to count the quantity of suspended state machines of the SSD.

In one embodiment, the judgment module is further configured to judge whether to receive a new host IO command according to the quantity of context resources, the quantity of being-used context resources and the quantity of suspended state machines.

In one embodiment, the resource determining module is configured to:

initialize a quantity of first context resources and a quantity of second context resources;

perform read/write IOPS tests based on an initial quantity of first context resources and an initial quantity of second context resources;

keep the quantity of first context resources unchanged and continuously increasing the quantity of second context resources, and continuously performing the IOPS tests until a throughput thereof is no longer increasing;

take a minimum quantity of second context resources corresponding to a maximum throughput as the quantity of the second context resources; and determine the quantity of the first context resources according to the quantity of the second context resources.

In one embodiment, the ratio of the quantity of the second context resources to the quantity of the first context resources is 1:32.

In one embodiment, the resource determining module is configured to:

count the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

In one embodiment, the judgment module is configured to:

stop receiving any new host IO command by the SSD when the quantity of being-used first context resources reaches the quantity of the first context resources or the quantity of suspended state machines reaches a preset threshold.

For the specific definition of the apparatus for improving quality of service of an SSD, please refer to the definition of the method for improving quality of service of an SSD hereinabove, which is not repeated herein. Each module in the above-mentioned apparatus for improving quality of service of an SSD can be implemented in whole or in part by software, hardware and their combinations. The above modules may be embedded in or independent of the processor in the computer device in a form of hardware, and may also be stored in the memory in the computer device in a form of software, so that the processor can call the above modules and execute the operations corresponding to the above modules.

Figure 4:
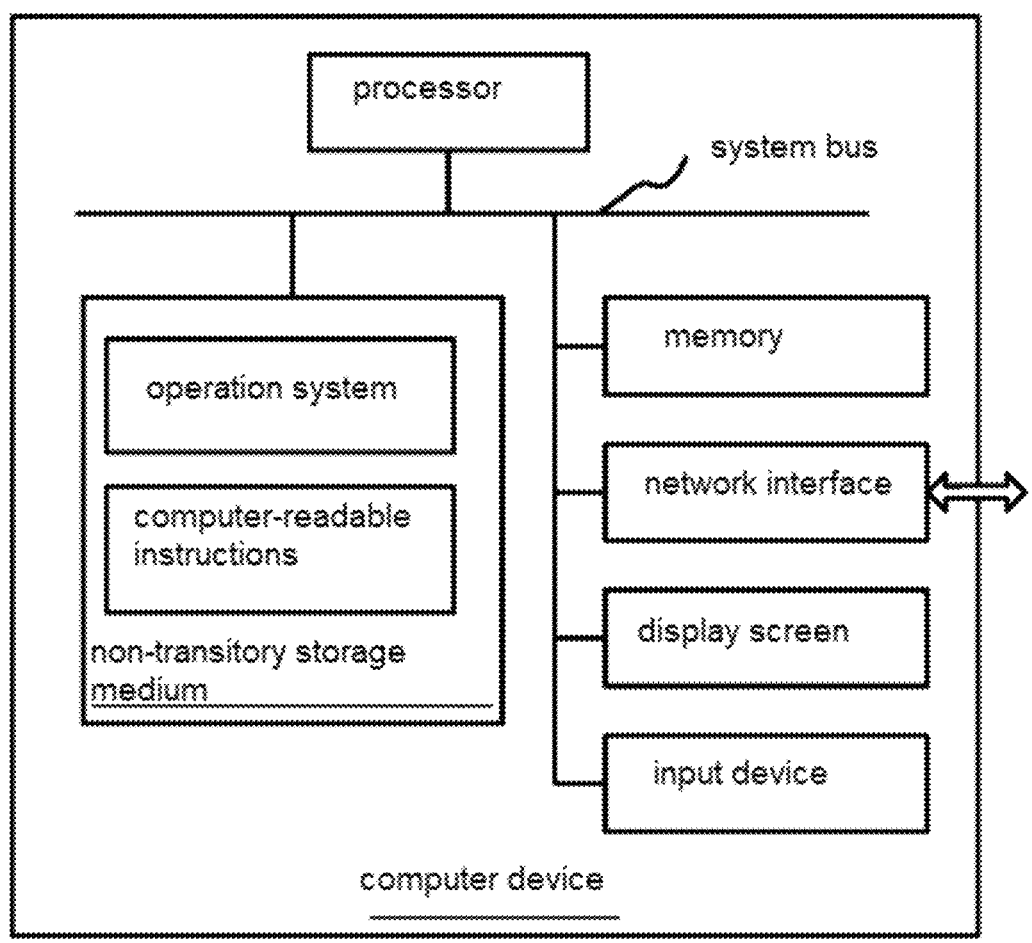
FIG. 4 is an internal structural diagram of a computer device provided by the present application according to one or more embodiments.

In one embodiment, a computer device is provided, which may be a terminal, and its internal structural diagram may be as shown in FIG. 4. The computer device comprises a processor, a memory, a network interface, a display screen and an input device interconnected by a system bus. Wherein the processor of the computer device is used for providing computing and control capabilities. The memory of the computer device comprises a non-transitory storage medium and an internal memory. The non-transitory storage medium stores an operation system and computer-readable instructions. The internal memory provides an environment for running the operation system and computer-readable instructions in the non-transitory storage medium. The network interface of the computer device is used to communicate with external terminals through network connection. The computer-readable instructions, when executed by the processor, implement the method for improving quality of service of an SSD. The display screen of the computer device may be a liquid crystal display screen or an electronic ink display screen, and the input device of the computer device may be a touch layer covered on the display screen, or may be a button, a trackball or a touchpad arranged on the shell of the computer device, or may be an external keyboard, touchpad or mouse.

It can be understood by those skilled in the art that the structure shown in FIG. 4 is only a block diagram of a part of the structure that is related to the scheme of the present application, and does not constitute a limitation on the computer device to which the scheme of the present application is applied. The specific computer device may include more or less components than those shown in the figure, or combine some components, or have different component arrangements.

The embodiment of the present application also provides a non-transitory computer-readable storage medium, and the non-transitory computer-readable storage medium stores computer-readable instructions, and when the computer program of the computer-readable instructions is executed by one or more processors, the steps of the method for improving quality of service of an SSD provided by any one of the above embodiments can be performed thereby.

Those skilled in the art can understand that all or part of the procedures for realizing methods of the above-mentioned embodiments can be completed by using computer-readable instructions to instruct related hardware, the computer-readable instructions can be stored in a non-transitory computer-readable storage medium, and when executed, the computer-readable instructions can include the procedures of the above-mentioned methods. Among them, any reference to memory, storage, database or other media used in the embodiments provided in the present application may include non-transitory and/or transitory memory. The non-transitory memory may include read-only memory (ROM), programmable ROM (PROM), electrically programmable ROM (EPROM), electrically erasable programmable ROM (EEPROM) or flash memory. The transitory memory may include random access memory (RAM) or external cache memory. By way of illustration and not limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), and direct Rambus dynamic RAM (DRDRAM), Rambus dynamic RAM (RDRAM), etc.

The technical features of the above embodiments can be combined at will. In order to make the description concise, not all possible combinations of the technical features in the above embodiments are described. However, as long as there is no contradiction caused by the combinations of these technical features, they should be considered as within the scope recorded in the present specification.

The above-mentioned embodiments only express several implementation ways of the present application, and their descriptions are more specific and detailed, but they cannot be understood as limiting the scope of the present invention patent application. It should be pointed out that, for those skilled in the art, without departing from the concept of the present application, various modifications and improvements can be made, which are within the protection scope of the present application. Therefore, the protection scope of the present patent application shall be subject to the appended claims.

The invention claimed is:

1. A method for improving quality of service of an SSD (Solid State Disk), comprising:

determining a quantity of context resources of an SSD, and managing the quantity of context resources by using a token bucket algorithm;

receiving and processing a host IO command, and counting a quantity of being-used context resources of the SSD; and judging whether to receive a new host IO command according to the quantity of context resources and the quantity of being-used context resources.

2. The method for improving quality of service of an SSD according to claim 1, wherein the method further comprises counting a quantity of suspended state machines of the SSD, wherein judging whether to receive a new host IO command according to the quantity of context resources and the quantity of being-used context resources comprises:

judging whether to receive a new host IO command according to the quantity of context resources, the quantity of being-used context resources and the quantity of suspended state machines.

3. The method for improving quality of service of an SSD according to claim 2, wherein the context resources of the SSD include first context resources and second context resources, wherein the first context resources are used for managing a quantity of receivable host IO commands, and the second context resources are used for managing data structures split from host IO commands.

4. The method for improving quality of service of an SSD according to claim 3, wherein determining the quantity of context resources of the SSD comprises:

initializing a quantity of first context resources and a quantity of second context resources;

performing read/write IOPS tests based on an initial quantity of first context resources and an initial quantity of second context resources;

keeping the quantity of first context resources unchanged and continuously increasing the quantity of second context resources, and continuously performing the read/write IOPS tests until a throughput thereof is no longer increasing;

taking a minimum quantity of second context resources corresponding to a maximum throughput as the quantity of the second context resources; and determining the quantity of the first context resources according to the quantity of the second context resources.

5. The method for improving quality of service of an SSD according to claim 4, wherein a ratio of the quantity of the second context resources to the quantity of the first context resources is 1:32.

6. The method for improving quality of service of an SSD according to claim 4, wherein counting a quantity of suspended state machines of the SSD comprises:

counting the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

7. The method for improving quality of service of an SSD according to claim 4, wherein judging whether to receive a new host IO command according to the quantity of context resources, the quantity of being-used context resources and the quantity of suspended state machines comprises:

stopping receiving any new host IO command by the SSD when the quantity of being-used first context resources reaches the quantity of the first context resources or the quantity of suspended state machines reaches a preset threshold.

8. A computer device comprising a memory and one or more processors, wherein computer-readable instructions are stored in the memory, and when executed by the one or more processors, the computer-readable instructions cause the one or more processors to perform steps of a method for improving quality of service of an SSD, the steps comprising:

determining a quantity of context resources of an SSD, and managing the quantity of context resources by using a token bucket algorithm;

receiving and processing a host IO command, and counting a quantity of being-used context resources of the SSD; and judging whether to receive a new host IO command according to the quantity of context resources and the quantity of being-used context resources.

9. The computer device according to claim 8, wherein the steps further comprise counting a quantity of suspended state machines of the SSD, wherein judging whether to receive a new host TO command according to the quantity of context resources and the quantity of being-used context resources comprises:

judging whether to receive a new host IO command according to the quantity of context resources, the quantity of being-used context resources and the quantity of suspended state machines.

10. The computer device according to claim 9, wherein the context resources of the SSD include first context resources and second context resources, wherein the first context resources are used for managing a quantity of receivable host IO commands, and the second context resources are used for managing data structures split from host IO commands.

11. The computer device according to claim 10, wherein determining the quantity of context resources of the SSD comprises:

initializing a quantity of first context resources and a quantity of second context resources;

performing read/write IOPS tests based on an initial quantity of first context resources and an initial quantity of second context resources;

keeping the quantity of first context resources unchanged and continuously increasing the quantity of second context resources, and continuously performing the read/write IOPS tests until a throughput thereof is no longer increasing;

taking a minimum quantity of second context resources corresponding to a maximum throughput as the quantity of the second context resources; and determining the quantity of the first context resources according to the quantity of the second context resources.

12. The computer device according to claim 11, wherein a ratio of the quantity of the second context resources to the quantity of the first context resources is 1:32.

13. The computer device according to claim 11, wherein counting a quantity of suspended state machines of the SSD comprises:

counting the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

14. The computer device according to claim 11, wherein judging whether to receive a new host IO command according to the quantity of context resources, the quantity of being-used context resources and the quantity of suspended state machines comprises:
stopping receiving any new host IO command by the SSD when the quantity of being-used first context resources reaches the quantity of the first context resources or the quantity of suspended state machines reaches a preset threshold.

15. A non-transitory computer-readable storage medium, with computer-readable instructions stored therein, wherein the computer-readable instructions, when executed by one or more processors, cause the one or more processors to perform steps of a method for improving quality of service of an SSD, the steps comprising:
determining a quantity of context resources of an SSD, and managing the quantity of context resources by using a token bucket algorithm;
receiving and processing a host IO command, and counting a quantity of being-used context resources of the SSD; and
judging whether to receive a new host IO command according to the quantity of context resources and the quantity of being-used context resources.

16. The non-transitory computer-readable storage medium according to claim 15, wherein the steps further comprise counting a quantity of suspended state machines of the SSD, wherein judging whether to receive a new host IO command according to the quantity of context resources and the quantity of being-used context resources comprises:
judging whether to receive a new host IO command according to the quantity of context resources, the quantity of being-used context resources and the quantity of suspended state machines.

17. The non-transitory computer-readable storage medium according to claim 16, wherein the context resources of the SSD include first context resources and second context resources, wherein the first context resources are used for managing a quantity of receivable host IO commands, and the second context resources are used for managing data structures split from host IO commands.

18. The non-transitory computer-readable storage medium according to claim 17, wherein determining the quantity of context resources of the SSD comprises:
initializing a quantity of first context resources and a quantity of second context resources;
performing read/write IOPS tests based on an initial quantity of first context resources and an initial quantity of second context resources;
keeping the quantity of first context resources unchanged and continuously increasing the quantity of second context resources, and continuously performing the read/write IOPS tests until a throughput thereof is no longer increasing;
taking a minimum quantity of second context resources corresponding to a maximum throughput as the quantity of the second context resources; and
determining the quantity of the first context resources according to the quantity of the second context resources.

19. The non-transitory computer-readable storage medium according to claim 18, wherein a ratio of the quantity of the second context resources to the quantity of the first context resources is 1:32.

20. The non-transitory computer-readable storage medium according to claim 18, wherein counting a quantity of suspended state machines of the SSD comprises:
counting the quantity of being-used second context resources, and when the quantity of being-used second context resources reaches the quantity of the second context resources, if the SSD receives a new host IO command, increasing the quantity of suspended state machines of the SSD by 1, and if the SSD finishes processing a host IO command, decreasing the quantity of suspended state machines of the SSD by 1.

* * * * *